United States Patent
Gonzalez et al.

(10) Patent No.: US 11,404,878 B2
(45) Date of Patent: Aug. 2, 2022

(54) METHOD FOR CONTROLLING AN ELECTRICAL TRANSMISSION LINK INCLUDING A DIRECT CURRENT HIGH VOLTAGE LINE

(71) Applicants: SUPERGRID INSTITUTE, Villeurbanne (FR); CENTRE NATIONAL DE LA RECHERCHE SCIENTIFIQUE, Paris (FR)

(72) Inventors: Juan Carlos Gonzalez, Lyons (FR); Valentin Costan, Lyons (FR); Gilney Damm, Lyons (FR); Abdelkrim Benchaib, Lyons (FR); Françoise Lamnabhi-Lagarrigue, Lyons (FR); Bruno Luscan, Lyons (FR)

(73) Assignees: SUPERGRID INSTITUTE, Villeurbanne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 25 days.

(21) Appl. No.: 16/979,641

(22) PCT Filed: Mar. 6, 2019

(86) PCT No.: PCT/EP2019/055602
§ 371 (c)(1),
(2) Date: Sep. 10, 2020

(87) PCT Pub. No.: WO2019/174999
PCT Pub. Date: Sep. 19, 2019

(65) Prior Publication Data
US 2021/0028627 A1   Jan. 28, 2021

(30) Foreign Application Priority Data

Mar. 13, 2018 (FR) ........................ 1852136
Apr. 13, 2018 (FR) ........................ 1853273

(51) Int. Cl.
*H02J 3/36* (2006.01)
*G05B 19/042* (2006.01)

(52) U.S. Cl.
CPC .............. *H02J 3/36* (2013.01); *G05B 19/042* (2013.01); *G05B 2219/2639* (2013.01)

(58) Field of Classification Search
None
See application file for complete search history.

(56) References Cited

U.S. PATENT DOCUMENTS

2014/0049228 A1* 2/2014 Rodriguez Cortes ... H02J 3/381
322/24

FOREIGN PATENT DOCUMENTS

CN    104078993 A    10/2014
CN    103715716 B    1/2016
(Continued)

OTHER PUBLICATIONS

L. Zhou et al., "Harmonic Voltage Distortion Damping Method for Parallel-Connected LCL-Type Inverters in Islanded Operation," in IEEE Transactions on Industrial Electronics, vol. 66, No. 11, pp. 9032-9044, Nov. 2019, doi: 10.1109/TIE.2018.2878124. (Year: 2018).*

A. Tarrasó, J. I. Candela, J. Rocabert and P. Rodriguez, "Grid voltage harmonic damping method for SPC based power converters with multiple virtual admittance control," 2017 IEEE Energy Conversion Congress and Exposition (ECCE), 2017, pp. 64-68, doi: 10.1109/ECCE.2017.8095762. (Year: 2017).*

(Continued)

*Primary Examiner* — Thomas C Lee
*Assistant Examiner* — Syed A Warsi
(74) *Attorney, Agent, or Firm* — Occhiuti & Rohlicek LLP (57) ABSTRACT

The invention relates to a method for controlling an electrical transmission link (3) between first and second AC voltage buses (11, 21) comprising a high-voltage DC line (320), first and second AC/DC converters (321, 322) connected to the high-voltage DC line (320), comprising:

(Continued)

retrieving a setpoint active power value (Pdc0) applied to a converter (321, 322);

retrieving the instantaneous values V1 and V2 of the voltages on the first and second buses;

wherein the setpoint active power of the first or of the second converter is modified by a value including a term ΔPdc, so as to impose new dynamics on the first and second areas, where:

$\Delta Pdc = \Delta Pdc_s + \Delta Pdc_a$.

20 Claims, 5 Drawing Sheets

(56) References Cited

FOREIGN PATENT DOCUMENTS

| | | |
|---|---|---|
| CN | 104124689 B | 3/2016 |
| EP | 0146726 B1 | 4/1987 |
| JP | S56148141 A | 11/1981 |

OTHER PUBLICATIONS

Ngamroo, L., "A stabilization of frequency oscillations using a power modulation control of HVDC link in a parallel AC-DC interconnected system," Power Conversion Conference, 2002, PCC-Osaka, Proceedings of the Osaka, Japan Apr. 2-5, 2002, Piscataway, NJ, USA, IEEE, US, vol. 3, Apr. 2, 2002, pp. 1405-1410.

Zhen Huang et al., "Study of AC/DC Power Coordinated Control for Multi-Circuit UHVDC Transmissions of Sichuan," Power and Energy Engineering Conference (APEEC), 2010 Asia-Pacific Date of Conference: Mar. 28-31, 2010, IEEE Piscataway, NJ, USA, Mar. 28, 2010, pp. 1-4.

Giddani O.A., et al., "Grid Integration of a Large Offshore Wind Farm using VSC-HVDC in parallel with an AC Submarine Cable," Universities Power Engineering Conference (UPEC), 2009 Proceedings of the 44th International IEEE, Piscataway, NJ, USA, Sep. 1, 2009, pp. 1-5.

* cited by examiner

METHOD FOR CONTROLLING AN ELECTRICAL TRANSMISSION LINK INCLUDING A DIRECT CURRENT HIGH VOLTAGE LINE

CROSS REFERENCE TO RELATED APPLICATIONS

This application is the national phase under 35 USC 371 of International Application No. PCT/EP2019/055602, filed Mar. 6, 2019, which claims the benefit of the priority date of French Application No. 1852136, filed Mar. 13, 2018 and French Application No. 1853273, filed Apr. 13, 2018. The contents of the aforementioned applications are incorporated herein in their entirety.

The invention relates to strategies for controlling electrical grids, in particular to control strategies for ensuring the stability of electrical grids including at least one AC power line and one DC power line connecting buses between AC voltage areas.

The document 'Inelfe, Europe's first integrated Onshore HVDC interconnection', published by P. Labra Francos et al in 2012 by the IEEE, describes the installation and operation of a high-voltage link including an AC power line and a DC power line, connected in parallel between France and Spain. The high-voltage DC power line has a respective AC/DC converter at each of its ends. These converters are voltage-controlled (referred to as VSC converters in the literature), thereby making it possible to independently control the active power on the DC side and the reactive power on the AC side.

During normal operation, the high-voltage direct-current line is controlled by way of its converters, in order to emulate the behavior of an AC transmission line by way of a virtual line reactance. The setpoint active power transmitted on the DC transmission line is then set on the basis of the phase offset between the nodes at the ends of this line and on the basis of the voltages on these nodes.

A malfunction at the terminals of such a link is sometimes reflected in a transient power imbalance, some generators accelerating and others decelerating. An evolution in the phase offset between the nodes of the grid is then observed. If the system is not able to return to a balanced state following a disturbance, it may become unstable since the power generators may run asynchronously and the exchange of power is then no longer able to be ensured.

In the event of a malfunction detected on the AC power line, the DC transmission line is operated while maintaining a fixed virtual line reactance. Specifically, since the line constructor has to guarantee stability thereof in the event of a malfunction, major feasibility studies have to be carried out on the stability of the line during transient operation. Keeping the virtual line reactance fixed makes such a stability study far easier.

However, such a system has even lower stability. The time available to eliminate a malfunction on the grid before causing desynchronization of the nodes at the ends of the line is thus still too short. Moreover, such a system does not make it possible to impose new dynamics on the AC voltage areas on either side of the transmission link.

The invention aims to overcome one or more of these drawbacks. The invention thus relates to a method for controlling an electrical transmission link between first and second AC voltage buses connected respectively to first and second AC voltage areas of an electrical transmission grid, the transmission link comprising a high-voltage DC line, a first AC/DC converter connected firstly to the first bus and secondly to the high-voltage DC line, and a second AC/DC converter connected firstly to the second bus and secondly to the high-voltage DC line, as claimed in appended claim 1.

The invention also relates to the variants of the dependent claims. A person skilled in the art will understand that each of the features of the variants in the description or in the dependent claims may be combined independently with the features of an independent claim without constituting an intermediate generalization.

Other features and advantages of the invention will become clearly apparent from the description thereof that is given below, by way of nonlimiting indication, with reference to the appended drawings, in which.

Figure 1:
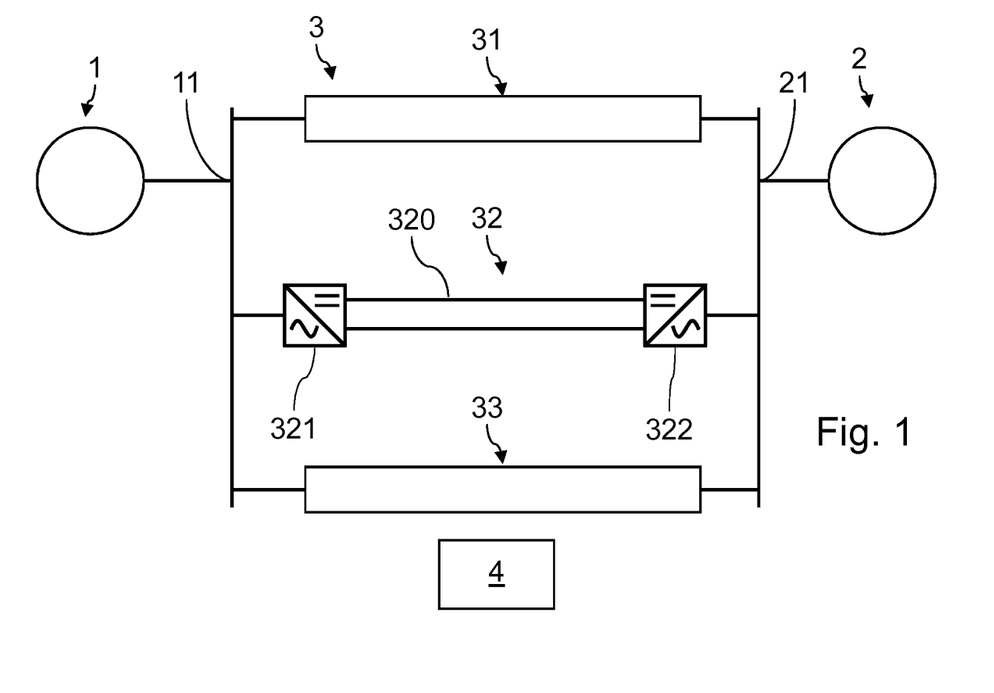
FIG. 1 is a circuit diagram of a system including a high-voltage link capable of implementing the invention.

FIG. 1 is a circuit diagram of a system including a high-voltage electrical transmission link 1 capable of implementing the invention. High voltage is understood here to mean a voltage at least equal to 10 kV in service on the link 3. The system here includes the high-voltage link 3, a high-voltage alternating-current area 1 and a high-voltage alternating-current area 2. The area 1 is connected to an alternating-current node or bus (sometimes referred to using the term bus bar) 11 connected to one end of the link 3 and the area 2 is connected to an alternating-current node or bus 21 connected to another end of the link 3. For the sake of simplicity, the system is represented here by likening the area 1 to an equivalent machine, and by likening the area 2 to a constant voltage and frequency grid ("infinite" grid), for one particular case.

The link 3 includes a high-voltage DC link 32 here and optionally a high-voltage AC line 31, which are connected in parallel between the buses 11 and 21. More precisely, the high-voltage DC link 32 comprises a high-voltage DC line 320, an AC/DC converter 321 connected to the bus 11 and to a first end of the line 320, and an AC/DC converter 322 connected to the bus 21 and to a second end of the line 320. The converters 321 and 322 advantageously have the same electrical characteristics.

The system furthermore includes a control circuit 4, configured so as to control the converters 321 and 322. The converters 321 and 322 are advantageously voltage-source converters. Such converters make it possible to independently regulate their active power and their reactive power. The active power management loop may be set to control either the active power injected into the AC grid to which the converter is connected, or the DC voltage on the line 320 to which it is connected. The reactive power loop may be set to regulate either the reactive power injected or absorbed at the connection point on a bus, or the voltage of the AC grid to which the converter is connected.

The converters 321 and 322 notably have the following functions in steady state (steady state will correspond hereinafter to operation in the absence of an electrical fault on the link 3): control the voltage on the line 320, control the bidirectional active power flow on the line 320, and control the reactive power injected or absorbed at the connection point. In steady state, the control circuit 4 is for example configured so as to control the converter 322 in master mode by controlling the voltage level on the line 320, the converter 321 then operating in slave mode by controlling the active power transmitted on the line 320. The master converter will discharge the active power controlled by the slave.

By virtue of its commands, the control circuit 4 is advantageously configured so as to emulate a virtual parallel admittance 33, in parallel with the line 31 and the link 32.

The control circuit 4 is initially configured so as to transmit a setpoint active power command to the first or the second converter, the value of which is retrieved. The power Pdc0 is transmitted in steady state by the link 32. The instantaneous values V1 and V2 of the voltages on the first and second buses are retrieved.

According to a first aspect of the invention, the control circuit 4 is configured so as then to transmit a reference active power Pref (Pref is typically the power setpoint applied in terms of controlling the converter operating in slave mode in the example cited above) defined as follows:

$$Pref=Pdc0+\Delta Pdc$$

ΔPdc is for example a term contained in the active power transmitted by way of the virtual parallel admittance 33 during a transient phase, for example in order to impose new dynamics on the grid including the areas 1 and 2. The reference power Pref should be between Pmin and Pmax, where Pmin=−Pmax, where Pmax is equal to the nominal power of the converter.

ΔPdc may be defined as follows:

$$\Delta Pdc=\Delta Pdc_s+\Delta Pdc_a$$

Where $\Delta Pdc_s$ is a synchronization term:

$$\Delta Pdc_s=\lambda\delta*(\delta ref-\delta)$$

where δ=δ1−δ2 is the phase offset between the voltages of the first and second buses for the retrieved instantaneous values, δ1 is the angle of the voltage on the first bus, δ2 is the angle of the voltage on the second bus, δref is an initial phase offset value between the voltages of the first and second buses, λδ is an amplification gain;
where $\Delta Pdc_a$ is a damping term:

$$\Delta Pdc_a=\lambda\omega*(\omega 1-\omega 2)$$

where ω1 is the electrical angular frequency of the area 1, ω2 is the electrical angular frequency of the area 2, λω is an amplification gain.

The control circuit 4 is advantageously configured so as to transmit a reference active power Pref defined as follows:

$$Pref=Pdc0+\Delta Pdc+\Delta Pdc_d,\alpha$$

where $\Delta Pdc_d$ is a term for estimating the disturbance.

ΔPdc is advantageously calculated so as to synchronize the areas 1 and 2. ΔPdc is advantageously calculated so as to damp the power oscillations of the transmission grid.

By emulating the virtual parallel admittance 33 during a transient phase, the setpoint active power is able to be modified transiently by a term ΔPdc1.

ΔPdc1 may be defined as follows:

$$\Delta Pdc1 = \frac{V1*V2}{X33}*\sin\delta = Y33|V1||V2|*\sin\delta$$

Where X33 is the line reactance emulated by the control circuit 4, Y33 is the line admittance emulated by the control circuit 4 for the admittance 33.

The control circuit 4 is for example configured so as to retrieve the following information, for example by way of measurement devices on the buses 11 and 21:
 the instantaneous values V1 and V2 of the voltages on the first and second buses;
 the instantaneous value δ of the phase offset between the voltages of the buses 11 and 21;
 the last value δref of the phase offset between the voltages of the buses 11 and 21 in the absence of a malfunction on the system (in the absence of a malfunction, δ=δref);
 the detection of a fault on the system;
 the electrical angular frequency ω on each bus.

In the event of an electrical fault or disturbance (for example a short circuit, change of mechanical power references of the electrical machines, temporary loss of a pole of the link 32), either on the transmission link 3 or on the bus 11 or on the bus 21, the control circuit 4 is configured so as to automatically modulate the setpoint active power of the first or of the second converter.

The control circuit 4 may be configured so as to communicate with the buses 11 and 21 in order to retrieve the phase angle values and the voltage values on these buses. The angular frequency of a bus may be determined either by taking an average of the angular frequencies of the machines connected to this bus or by measuring the angular frequency on this bus.

For example, following an electrical fault, the control circuit 4 modulates the active power setpoint applied to the converters 321 and 322. The setpoint active power variation is set:
 either on the basis of the evolution of the phase difference between the voltages of the buses 11 and 21. The evolution of the phase difference may for example be measured by the value (δ−δref), representative of the evolution of the phase difference after the electrical fault. Taking into consideration the evolution of the phase difference in this way makes it possible to define the frequencies of oscillations between the nodes 11 and 21;
 or on the basis of the electrical angular frequency of the voltage on the bus 11, likened here to an electrical machine. Taking into consideration the angular frequency on the bus 11 in this way makes it possible to take into consideration the frequency variation between the buses 11 and 21, in order to damp the oscillations between the two areas 1 and 2 (in accordance with FIG. 1);
 or on the basis of a disturbance Per of a certain amplitude. A disturbance is a power variation, for example a mechanical power variation of the machine equivalent to the area 1, or a load variation in this area.

The control law for the line admittance Yv emulated by the control circuit 4 for the admittance 33 for example in order to follow an electrical fault (or a grid disturbance), may for example take the following form for the particular case presented above:

$$\Delta Pdc = Pm - Pl - Pdc0 - \frac{V1*V2}{X31}*\sin\delta +$$
$$\lambda_\delta*(\delta ref - \delta) + \lambda_\omega^*\Delta\omega - \left[Pm - Pl - Pdc0 - \frac{V1*V2}{X31}*\sin\delta\right]$$

being a first term that makes it possible to quickly compensate grid disturbances such as for example a load variation within an area;

$\lambda_\delta *(\delta ref-\delta)$ being a second term that makes it possible to supply a synchronization power in the two areas and to define the frequency of the inter-area oscillations;

$\lambda_\omega *\Delta\omega$ being a third term that makes it possible to supply a damping power on the basis of $\Delta\omega$ and to control the damping of the inter-area oscillations.

The control law contains two permanently activated terms, which are the terms for supplying the damping power and the synchronization power, respectively. The term "grid disturbance compensation" is an optional term, and it may be activated permanently based on real-time measurements, or it may be activated following a disturbance identification process.

There may be provision for the control law to take into consideration only one or more of the first to third terms according to a first aspect of the invention.

The control law for the control circuit 4 thus makes it possible to increase the stability of the system when an electrical fault or a disturbance occurs, by dynamically modifying the emulated line admittance when such an electrical fault occurs. The control law notably makes it possible to reduce the increase in the kinetic energy of the generator(s) during a fault, and increases the deceleration energy available for the generator after the fault has been eliminated. This results in an increase in the transient stability margin. The control law makes it possible to handle any electromechanical oscillations of the generator occurring after the fault has been eliminated.

The control circuit 4 may advantageously control the converters 321 and 322, so as to transiently damp the oscillations in the event of a malfunction being detected.

The link 32 has very high dynamics in comparison with the AC grid. The link 32 provided with the converters 321 and 322 furthermore makes it possible to independently control the active and reactive powers transmitted on the line 320. Each converter 321 and 322 may therefore behave like the equivalent of a current source with independent control of the active and reactive powers with respect to the AC grid. Assuming that the losses are negligible on the line 320, it is possible to use the injection model, according to which an active power injected into the line 320 by the converter 321 is equal to an active power drawn by the converter 322 from this line 320.

The following equation in steady state may then be derived therefrom:

$$M\frac{d\delta^2}{d^2t} + D\frac{d\delta}{dt} = Pm - Pl - Pdc0 - Pac$$

Where M is the equivalent inertia of the system, D is the equivalent damping of the system, Pm is the mechanical power applied to the equivalent machine likened to the area 1, Pl is the electric power drawn by an equivalent load from the area 1 in FIG. 1, Pdc0 is the active power initially transmitted by the link 32 in steady state, and Pac is the active power initially transmitted by the line 31 in steady state.

If the control circuit 4 commands the transmission of an active power $\Delta Pdc$ via the virtual parallel admittance 13, the above relationship becomes the following dynamic equation:

$$M\frac{d\delta^2}{d^2t} + D\frac{d\delta}{dt} = Pm - Pl - Pdc0 - Pac - \frac{V1*V2}{X33}\sin\delta$$

X31 corresponds to the reactance of the line 31, X33 corresponding to the reactance of the virtual line 33.

The dynamic equation may be rewritten as follows:

$$\begin{cases} \frac{d\delta}{dt} = \Delta\omega \\ M\frac{d\Delta\omega}{dt} + D\frac{d\delta}{dt} = Pm - Pl - Pdc0 - \frac{V1*V2}{X31}\sin\delta - \\ \qquad\qquad Yv*V1*V2*\sin\delta \end{cases}$$

The control parameter corresponds to the power value flowing through the virtual admittance 33. In order to control the system through the virtual admittance value, it is possible for example to use a feedback linearization technique may be adopted: the aim is to transform the dynamics of the nonlinear system into a partially linear system through feedback. The power flowing through the virtual admittance 33 may be written as follows:

$$Yv|V1||V2|*\sin\delta = Pm - Pl - Pdc0 - \\ \frac{V1*V2}{X31}\sin\delta + M*K\delta*(\delta ref - \delta) + (M*K\omega - D)*\Delta\omega$$

$K\delta$ and $K\omega$ being gains, making the system likenable to a damped oscillating system. By combining this equation with the above dynamic equation, the dynamics of the closed-loop system may be defined as follows:

$$\begin{cases} \frac{d\delta}{dt} = \Delta\omega \\ \frac{d\Delta\omega}{dt} = -\lambda_\delta(\delta ref - \delta) - \lambda_\omega \Delta\omega \end{cases}$$

A linear system is thus obtained.

By changing variable $x1=(\delta ref-\delta)$ and $x2=\delta\omega$, the system may be written as follows:

$$\begin{bmatrix} \dot{x1} \\ \dot{x2} \end{bmatrix} = \begin{bmatrix} 0 & 1 \\ -K\delta & -K\omega \end{bmatrix}\begin{bmatrix} x1 \\ x2 \end{bmatrix}$$

The dynamics of the closed-loop system may thus be chosen by selecting the values $K\delta$ and $K\omega$. The characteristic polynomial of this state matrix may be identified by a second-order system:

$$s^2 + K\omega*s + K\delta = \lambda^2 + 2*\xi*\omega n*\lambda + \omega n^2$$

It is then possible to calculate the gains $K\delta$ and $K\omega$ in order to define the desired natural frequency $\omega n$ and the desired damping coefficient for the system:

$$\begin{cases} K\delta = \omega n^2 \\ K\omega = 2\xi*\omega n \end{cases}$$

Advantageously, ωn is a frequency between 0.3 and 0.7 Hz, preferably between 0.4 and 0.6 Hz. Advantageously, ξ is a damping factor between 0.4 and 0.8, preferably between 0.5 and 0.7.

These calculations were based on the scenario that the bus 21 is connected to an infinite grid. By performing similar calculations for the case in which the area 2 corresponds to an equivalent machine, it is easily possible to demonstrate that the gains may be defined identically to the above case.

For a more generic case, the setpoint active power of the first or of the second converter is transiently modified by a term including a term $\Delta Pdc_d$, so as to impose new dynamics on the first and second areas, where:

$$\Delta Pdc_d = Pdc0 + V1*V2 \sin \delta/X31 - (M1*M2)/(M1+M2)*$$
$$(((Pm1-Pl1-D1*d\delta 1/dt)/M1) - ((Pm2-Pl2-D2*d\delta 2/dt)/M2)$$

Where M1 and D1 are the electrical inertia and damping of an electrical machine equivalent to the area 1, M2 and D2 are the electrical inertia and damping of an electrical machine equivalent to the area 2, λδ and λω are the amplification gains defined beforehand, Pm1 is the mechanical power of the electrical machine equivalent to the area 1, Pl1 is an electrical load equivalent to the area 1, Pm2 is the mechanical power of the electrical machine equivalent to the area 2, Pl2 is an electrical load equivalent to the area 2.

The setpoint active power of the first or of the second converter may also be modified transiently by a term including a term ΔPdc1, where:

$$\Delta Pdc1 = Y33|V1||V2|*\sin \delta$$

Y33 being modified on the basis of the values V1 and V2, on the basis of the evolution of the phase difference δ, on the basis of the angular frequency differences between the voltages of the first and second buses, or on the basis of a disturbance amplitude.

Figure 2:
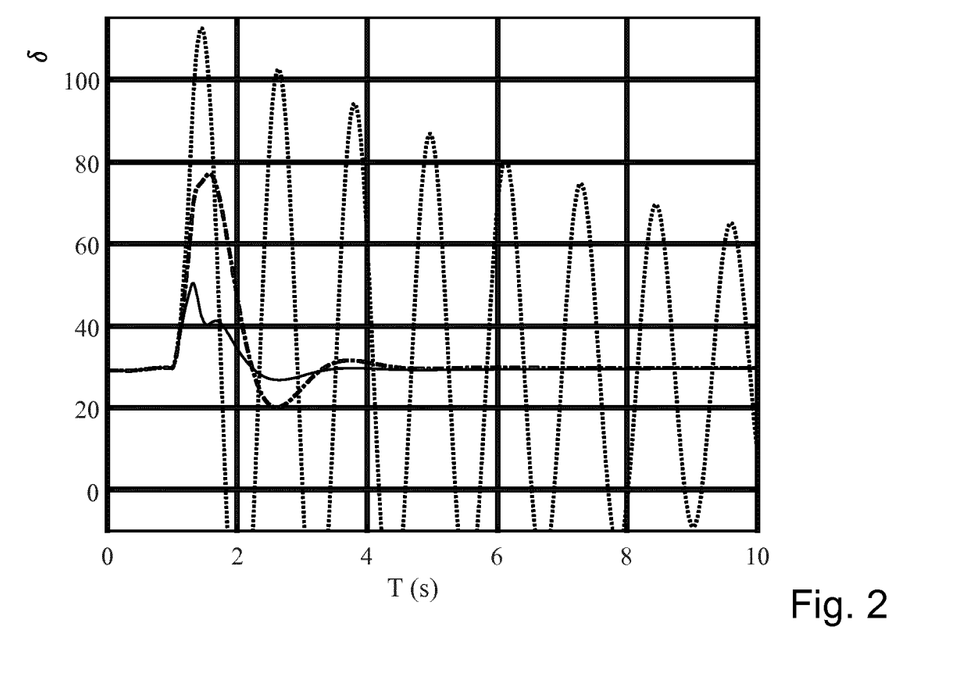
FIGS. 2 to 4 illustrate the evolution of various parameters according to simulations performed in order to implement the invention, for a case of disconnection of the AC line.
Figure 3:
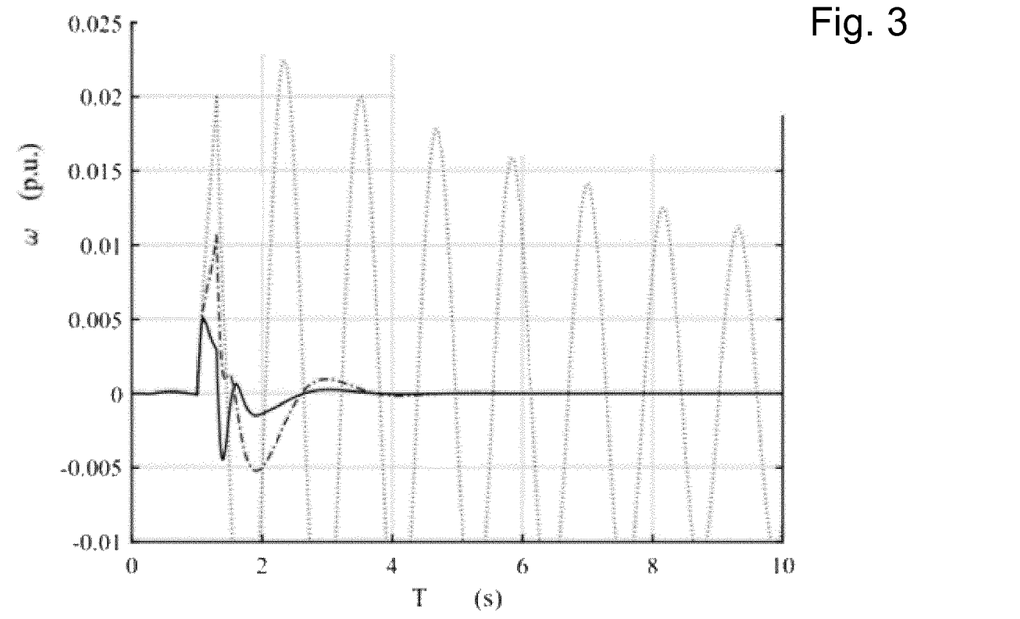
Figure 4:
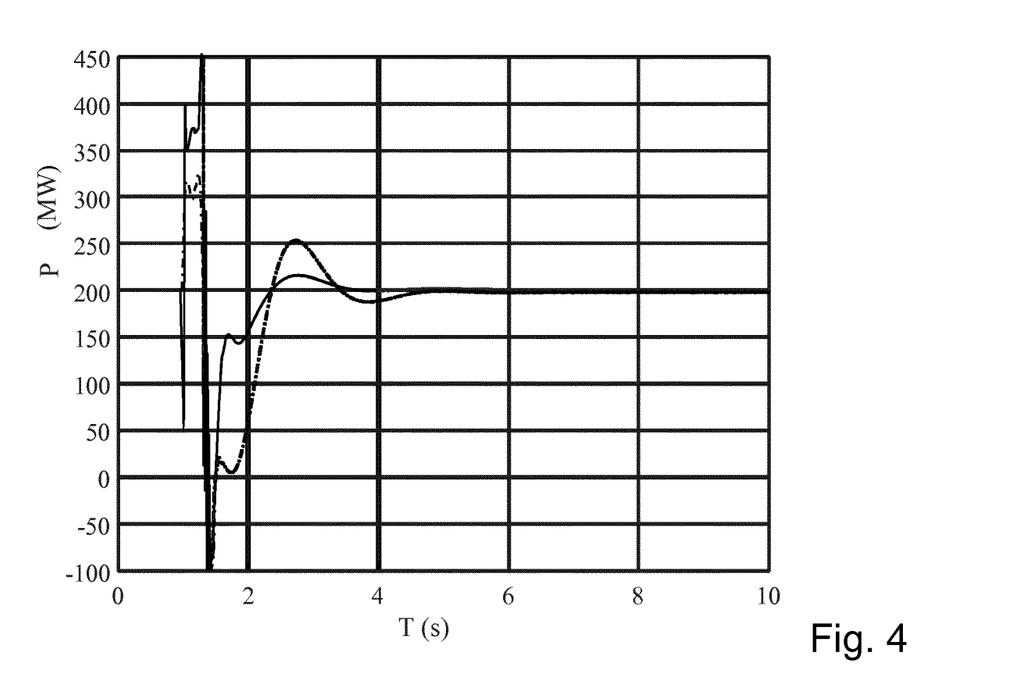

The graphs in FIGS. 2 to 4 illustrate the evolution of various parameters according to simulations performed in order to implement the invention, for a first fault case.

The following scenarios have been taken into consideration:
- a generator receiving a mechanical power of 500 MW, and an electrical load of 100 MW that are connected to the bus 11. The generator connected to the bus 11 has an inertia of 3.5 s;
- a generator receiving a mechanical power of 100 MW, and an electrical load of 500 MW that are connected to the bus 21. The generator connected to the bus 21 has an inertia of 3 s.

In steady state, the power transmitted between the buses 11 and 21 is distributed at 200 MW for the line 31, and 200 MW for the link 32. A phase offset of 30° between the voltages of the buses 11 and 21 in steady state, and a line 320 with a length of 200 km, will be taken as a scenario.

In order to implement the invention, a natural frequency value ωn of 0.5 Hz and a damping factor value ξ of 0.6 were chosen.

The electrical fault studied here is a three-phase fault on the line 31, lasting 300 ms. This fault occurs at the time t=1 s on the graphs. The dotted curves correspond to a link according to the prior art, without dynamic management of a virtual admittance 33 after the electrical fault, with the active power on the line 320 being maintained at the same setpoint value as before the fault. The dot-and-dash curves correspond to an implementation of the invention with management of the virtual admittance 33 by limiting the power on the line 320 to 300 MVA. The curves in an unbroken line correspond to an implementation of the invention with management of the virtual admittance 33 by limiting the power on the line 320 to 600 MVA.

The graph in FIG. 2 illustrates the phase offset (in °) between the voltages of the buses 11 and 21. The graph in FIG. 3 illustrates the angular frequency difference (per unit) between the buses 11 and 21 of the grid. The graph in FIG. 4 illustrates the active power transmitted on the line 320.

It may be seen that, in the absence of a dynamic virtual admittance when an electrical fault occurs, by just keeping a constant active power on the link 320, the phase offset between the buses 11 and 21 reaches a very high amplitude and exhibits significant oscillations after the fault has been eliminated, resulting in desynchronization between the buses 11 and 21. The angular frequency difference between the buses 11 and 21 is also very high in this configuration, this angular frequency difference also exhibiting poorly damped oscillations after the electrical fault has been eliminated.

Even by limiting the active power on the line 320 to 300 MVA, the amplitude of the phase offset between the voltages of the buses 11 and 21 and the amplitude of the angular frequency difference between the buses 11 and 21 are greatly reduced. It may be seen that, even by limiting the active power, the dynamics of the grid have been modified. The oscillations of the phase offset and of the angular frequency difference are moreover damped very quickly, even after the fault has been eliminated. The active power on the line 31 is moreover limited to 450 MW when the electrical fault occurs.

By limiting the active power on the line 320 to 600 MVA, the amplitude of the phase offset between the voltages of the buses 11 and 21 and the amplitude of the angular frequency difference between the buses 11 and 21 are even more greatly reduced. The oscillations of the phase offset and of the angular frequency difference are damped even more quickly, even after the fault has been eliminated. The active power on the line 31 is moreover limited to 350 MW when the electrical fault occurs.

It may be seen that, with the implementation of the invention for such a fault, the line 320 makes it possible to ensure synchronism between the areas 1 and 2, despite the outage on the line 31.

Figure 5:
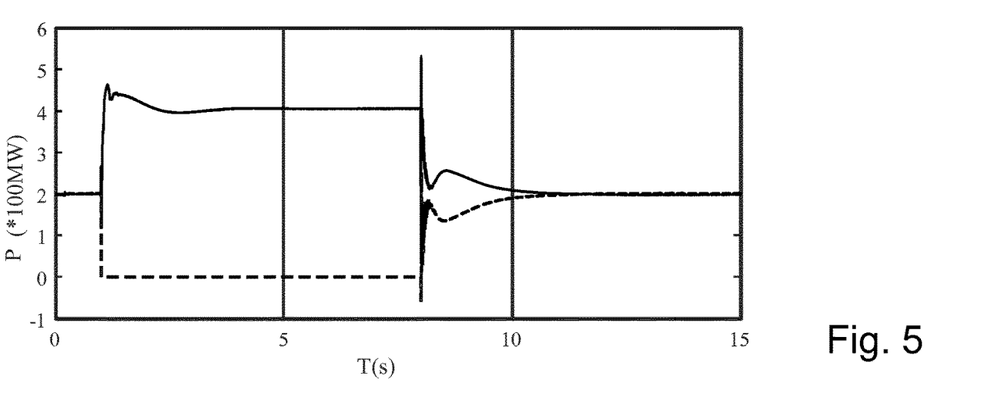
FIGS. 5 to 7 illustrate various parameters in the event of disconnection of the AC line until it is reconnected, with one exemplary implementation of the invention.
Figure 6:
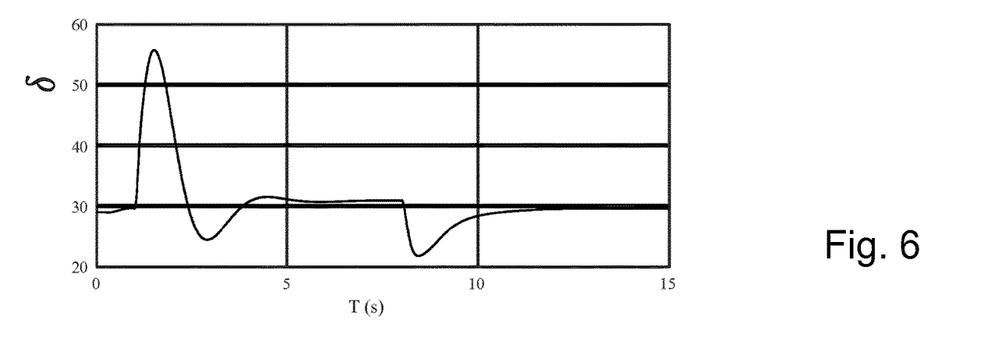
Figure 7:
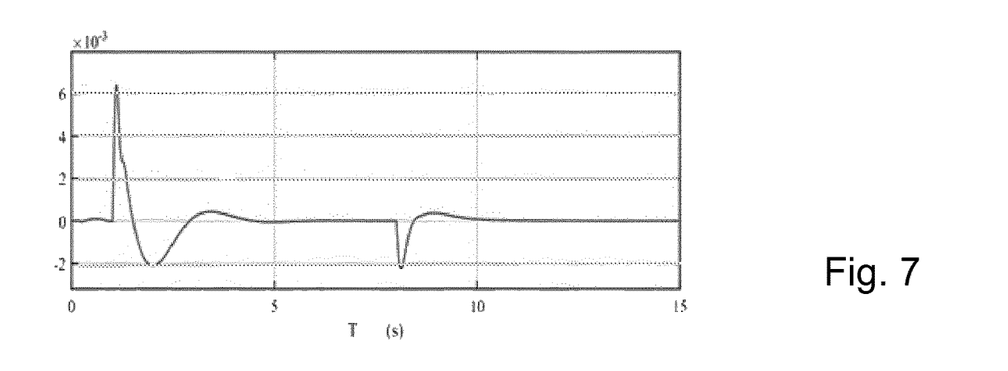

The fact that stability and the phase offset are maintained is better illustrated by way of the graphs in FIGS. 5 to 7, corresponding to the implementation of the invention with an active power limitation to 600 MVA on the line 320. The line 31 is disconnected very quickly at t=1 s, and then reconnected at t=8 s.

FIG. 5 illustrates the active power on the line 320 in an unbroken line, and the dashed line represents the active power on the line 31. FIG. 6 illustrates the phase difference (in °) between the voltages of the buses 11 and 21 over the same time interval. FIG. 7 illustrates the electrical angular frequency difference (per unit) between the buses 11 and 21 over the same time interval.

The graph in FIG. 6 illustrates that, fairly quickly after the electrical fault, the phase offset between the voltages of the buses 11 and 21 stabilizes at a value quite close to that before the fault, despite the disconnection of the line 31. The graph in FIG. 7 illustrates that, fairly quickly after the electrical fault, the angular frequency difference between the buses 11 and 21 converges to 0, despite the disconnection of the line 31. The two areas 1 and 2 therefore remain synchronous despite the disconnection of the line 31.

Figure 11:
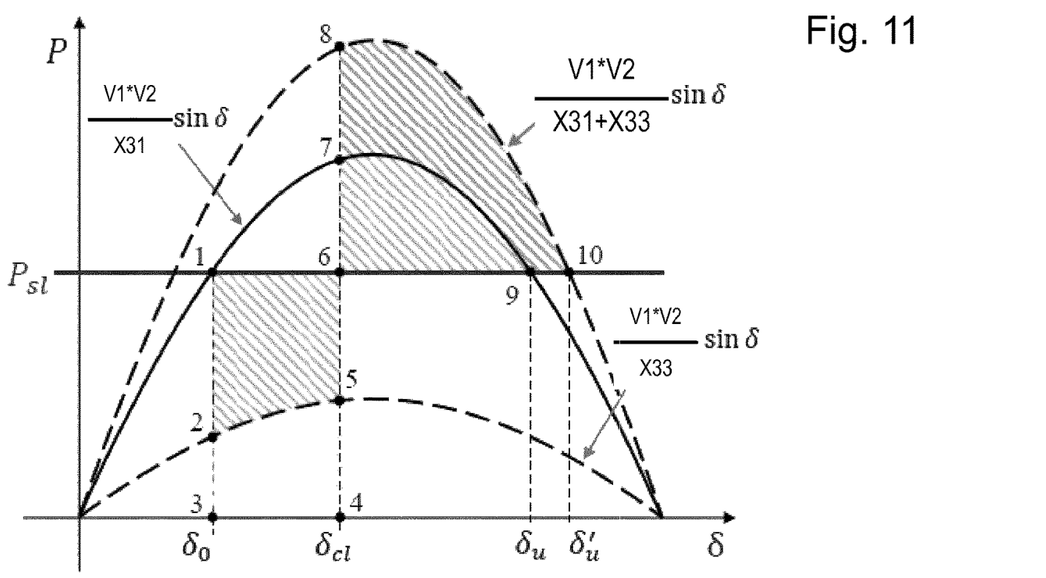
FIG. 11 is a graph of power against angle illustrating the implementation of the invention when the AC line is disconnected.

FIG. 11 is a graph of power against angle illustrating the implementation of the invention when the first malfunction case occurs. X31 corresponds to the reactance of the line 31, X33 corresponding to the reactance of the virtual line 33. At point 1, the system is initially balanced, with a phase offset δ0 between the areas 1 and 2. When the electrical fault occurs, the power transmitted on the line 31 becomes zero. When the electrical fault is detected, the virtual admittance 33 is activated, so as to transmit more power on the line 320. There is thus a transition to point 2 of the graph, keeping the phase offset δ0. The rotor of the generator likened to the area 1 sees its speed increase until it reaches a phase offset angle δc1 at point 5. The kinetic energy acquired by the rotor is however limited, due to the electric power transmitted by the virtual admittance 33, thereby increasing the stability of the system.

The electrical fault is then eliminated. With the power again supplied by the line 31, there is then a transition to point 8 on the graph, corresponding to the addition of a power on the line 31 and through the virtual admittance 33. Starting from point 8, the rotor corresponding to the generator of the area 1 slows down, with an increase in the phase offset angle between the areas 1 and 2.

Point 10 corresponds to the phase offset limit that guarantees the stability of the system. It may be seen that the phase offset limit angle δu' is greater than the phase offset limit angle δu (point 9 of the graph) in the absence of implementation of the invention.

Figure 8:
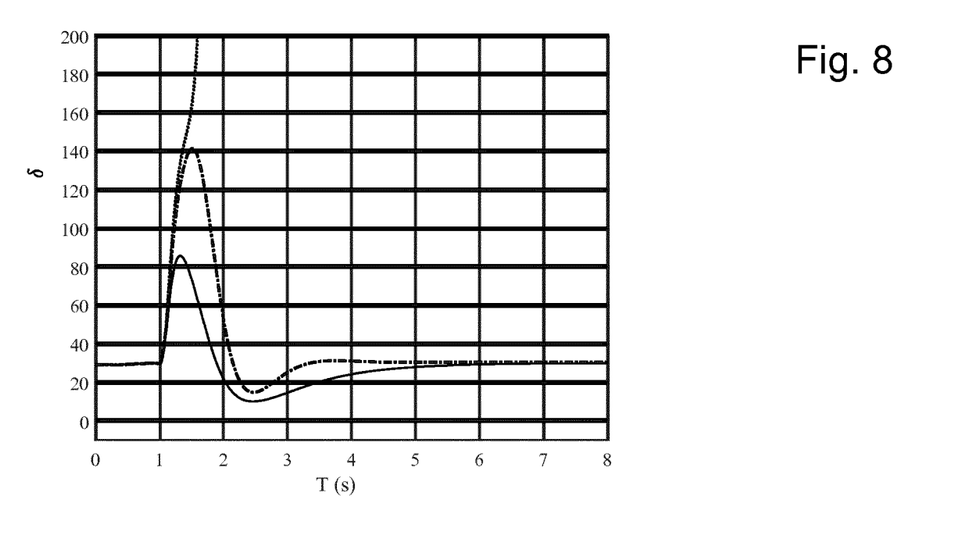
FIGS. 8 to 10 illustrate the evolution of various parameters according to simulations performed in order to implement the invention, for another fault case.
Figure 9:
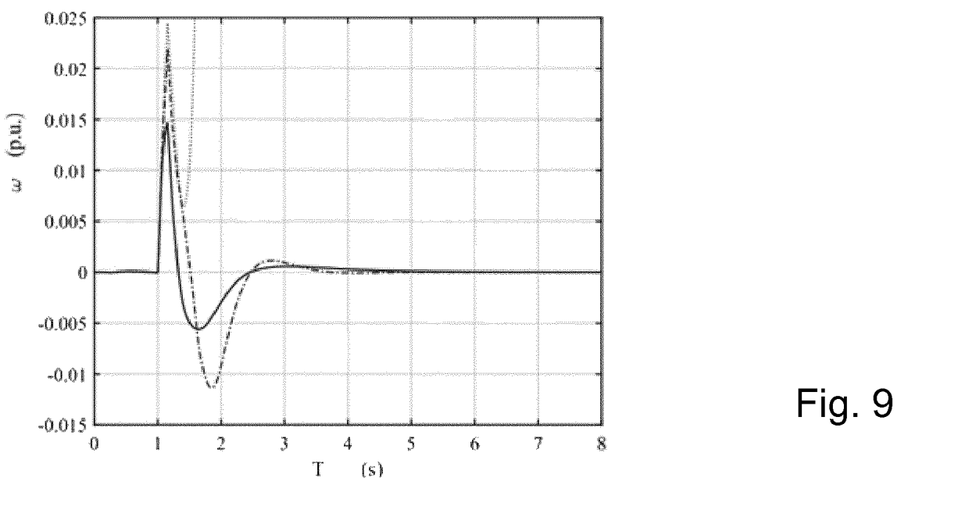
Figure 10:
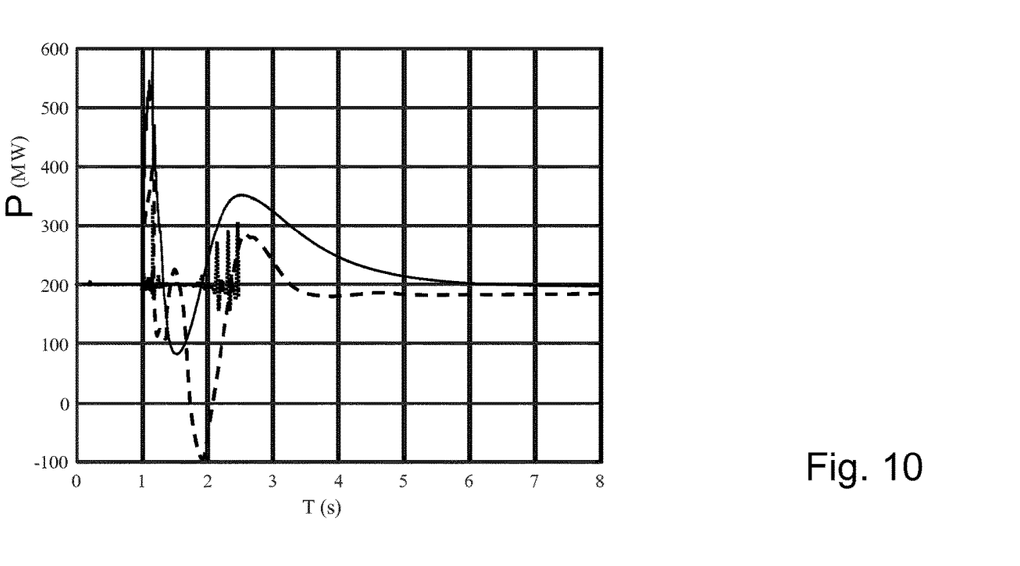

The graphs in FIGS. 8 to 10 illustrate the evolution of various parameters according to simulations performed in order to implement the invention, for a second fault case.

The scenarios are identical to those for the first fault. The electrical fault here is a short circuit in the area 2, leading to a multiplication of the electrical load by a factor of 3 for a period of 150 ms.

This fault occurs at the time t=1 s on the graphs. The dotted curves correspond to a link according to the prior art, without dynamic management of a virtual admittance 33 after the electrical fault, with the active power on the line 320 being kept at the same setpoint value as before the fault. The dot-and-dash curves correspond to an implementation of the invention with management of the virtual admittance 33 by limiting the power on the line 320 to 300 MVA. The curves in an unbroken line correspond to an implementation of the invention with management of the virtual admittance 33 by limiting the power on the line 320 to 600 MVA.

The graph in FIG. 8 illustrates the phase offset (in °) between the voltages of the buses 11 and 21. The graph in FIG. 9 illustrates the angular frequency difference (per unit) between the buses 11 and 21 of the grid. The graph in FIG. 10 illustrates the active power transmitted on the line 320.

It may be seen that, in the absence of a dynamic virtual admittance when an electrical fault occurs, by just keeping a constant active power on the link 320, the phase offset between the voltages of the buses 11 and 21 increases very quickly and is not limited. The angular frequency difference between the buses 11 and 21 also increases quickly and without any limit. This thus results in desynchronization between the areas 1 and 2.

Even by limiting the active power on the line 320 to 300 MVA, the amplitude of the phase offset between the voltages of the buses 11 and 21 and the amplitude of the angular frequency difference between the buses 11 and 21 are limited. Oscillations of the phase offset and of the angular frequency difference are moreover damped very quickly.

By limiting the active power on the line 320 to 600 MVA, the amplitude of the phase offset between the voltages of the buses 11 and 21 and the amplitude of the angular frequency difference between the buses 11 and 21 are even more greatly reduced. The oscillations of the phase offset and of the angular frequency difference are damped even more quickly.

For such a fault type, implementing the invention makes it possible to benefit from a power reserve in order to avoid a grid dropout in the event of a fault.

The invention claimed is:

1. A method comprising using a control circuit for controlling an electrical transmission link between first and second AC voltage buses connected respectively to first and second AC voltage areas of an electrical transmission grid, the transmission link comprising a high-voltage DC line, a first AC/DC converter connected firstly to the first bus and secondly to the high-voltage DC line, and a second AC/DC converter connected firstly to the second bus and secondly to the high-voltage DC line, wherein using said control circuit comprises causing said control circuit to carry out the steps of:

retrieving a setpoint active power value (Pdc0) applied to the first or to the second AC/DC converter;

retrieving the instantaneous values V1 and V2 of the voltages on the first and second AC voltage buses, respectively;

wherein the setpoint active power of the first AC/DC converter or of the second AC/DC converter is modified by a value including a term $\Delta Pdc$, so as to impose new dynamics on the grid including the first and second areas, where:

$$\Delta Pdc = \Delta Pdc_s + \Delta Pdc_a$$

where $\Delta Pdc_s$ is a synchronization term:

$$\Delta Pdc_s = \lambda\delta * (\delta ref - \delta)$$

where $\delta = \delta 1 - \delta 2$ is the phase offset between the voltages of the first and second buses for the retrieved instantaneous values, $\delta 1$ is the angle of the voltage on the first bus, $\delta 2$ is the angle of the voltage on the second bus, $\delta ref$ is an initial phase offset value between the voltages of the first and second buses, $\lambda\delta$ is an amplification gain;

where $\Delta Pdc_a$ is a damping term:

$$\Delta Pdc_a = \lambda\omega * (\omega 1 - \omega 2)$$

where $\omega 1$ is the electrical angular frequency of the area 1, $\omega 2$ is the electrical angular frequency of the area 2, and $\lambda\omega$ is an amplification gain.

2. The control method as claimed in claim 1, wherein the setpoint active power of the first or of the second converter is modified by a value including a term $\Delta Pdc_d$ a term for estimating the disturbance.

3. The control method as claimed in claim 2, wherein $\lambda\delta = K\delta$ et $\lambda\omega = K\omega$, where $K\delta = \omega n^2$ and $K\omega = 2*\xi*\omega n$, where $\omega n$ is a frequency between 0.3 and 0.7 Hz and $\xi$ is a damping factor between 0.4 and 0.8.

4. The control method as claimed in claim 2, wherein the term for estimating the disturbance $\Delta Pdc_d$ is calculated as follows:

$$\Delta Pdc_d = Pdc1 + V1*V2 \sin \delta/X31 - (M1*M2)/(M1+M2)* (((Pm1-Pl1-D1*d\delta1/dt)/M1)-((Pm2-Pl2-D2*d\delta2/dt)/M2)$$

where M1 and D1 are the electrical inertia and damping of an electrical machine equivalent to the first area, M2 and D2 are the electrical inertia and damping of an electrical machine equivalent to the second area, Pm1 is the mechanical power of the electrical machine equivalent to the first area, Pl1 is an electrical load equivalent to the first area, Pm2 is the mechanical power of the electrical machine equivalent to the second area, Pl2 is an electrical load equivalent to the second area, X31 is the reactance of the high-voltage AC line, where Pdc0 is the retrieved applied setpoint active power value.

5. The control method as claimed in claim 1, wherein the first or the second AC/DC converter is controlled so as to emulate a dynamic virtual admittance Y33 by transiently modifying its setpoint active power value by a value including a term $\Delta Pdc1$, where:

$$\Delta Pdc1 = Y33|V1||V2|*\sin \delta$$

Y33 being modified on the basis of the values V1 and V2, on the basis of the evolution of the phase difference δ, on the basis of the angular frequency differences between the voltages of the first and second buses, or on the basis of a disturbance amplitude.

6. The control method as claimed in claim 1, wherein said first and second converters are voltage-source converters.

7. The control method as claimed in claim 1, wherein the transmission link comprises one or more high-voltage AC lines.

8. The control method as claimed in claim 3, wherein the term for estimating the disturbance $\Delta Pdc_d$ is calculated as follows:

$$\Delta Pdc_d = Pdc0 + V1*V2 \sin \delta/X31 - (M1*M2)/(M1+M2)*(((Pm1-Pl1-D1*d\delta1/dt)/M1) - ((Pm2-Pl2-D2*d\delta2/dt)/M2)$$

where M1 and D1 are the electrical inertia and damping of an electrical machine equivalent to the first area, M2 and D2 are the electrical inertia and damping of an electrical machine equivalent to the second area, Pm1 is the mechanical power of the electrical machine equivalent to the first area, Pl1 is an electrical load equivalent to the first area, Pm2 is the mechanical power of the electrical machine equivalent to the second area, Pl2 is an electrical load equivalent to the second area, X31 is the reactance of the high-voltage AC line, where Pdc0 is the retrieved applied setpoint active power value.

9. The control method as claimed in claim 2, wherein the first or the second AC/DC converter is controlled so as to emulate a dynamic virtual admittance Y33 by transiently modifying its setpoint active power value by a value including a term $\Delta Pdc1$, where:

$$\Delta Pdc1 = Y33|V1||V2|*\sin \delta$$

Y33 being modified on the basis of the values V1 and V2, on the basis of the evolution of the phase difference δ, on the basis of the angular frequency differences between the voltages of the first and second buses, or on the basis of a disturbance amplitude.

10. The control method as claimed in claim 3, wherein the first or the second AC/DC converter is controlled so as to emulate a dynamic virtual admittance Y33 by transiently modifying its setpoint active power value by a value including a term $\Delta Pdc1$, where:

$$\Delta Pdc1 = Y33|V1||V2|*\sin \delta$$

Y33 being modified on the basis of the values V1 and V2, on the basis of the evolution of the phase difference δ, on the basis of the angular frequency differences between the voltages of the first and second buses, or on the basis of a disturbance amplitude.

11. The control method as claimed in claim 4, wherein the first or the second AC/DC converter is controlled so as to emulate a dynamic virtual admittance Y33 by transiently modifying its setpoint active power value by a value including a term $\Delta Pdc1$, where:

$$\Delta Pdc1 = Y33|V1||V2|*\sin \delta$$

Y33 being modified on the basis of the values V1 and V2, on the basis of the evolution of the phase difference δ, on the basis of the angular frequency differences between the voltages of the first and second buses, or on the basis of a disturbance amplitude.

12. The control method as claimed in claim 2, wherein said first and second converters are voltage-source converters.

13. The control method as claimed in claim 3, wherein said first and second converters are voltage-source converters.

14. The control method as claimed in claim 4, wherein said first and second converters are voltage-source converters.

15. The control method as claimed in claim 5, wherein said first and second converters are voltage-source converters.

16. The control method as claimed in claim 2, wherein the transmission link comprises one or more high-voltage AC lines.

17. The control method as claimed in claim 3, wherein the transmission link comprises one or more high-voltage AC lines.

18. The control method as claimed in claim 4, wherein the transmission link comprises one or more high-voltage AC lines.

19. The control method as claimed in claim 5, wherein the transmission link comprises one or more high-voltage AC lines.

20. The control method as claimed in claim 6, wherein the transmission link comprises one or more high-voltage AC lines.

* * * * *